Patented Aug. 1, 1950

2,517,526

UNITED STATES PATENT OFFICE 2,517,526

2-FORMYLETHANES AND METHOD OF PREPARING SAME

Erwin Kuh, New Brunswick, N. J., assignor to American Cyanamid Company, New York, N. Y., a corporation of Maine No Drawing. Application August 10, 1946, Serial No. 689,806

9 Claims. (Cl. 260—286)

The present invention relates to the preparation of new organic compounds. More particularly, it relates to 2-halo-2-formylethanes and methods of preparing the same.

The new compounds of the present invention may be illustrated by the following general formula:

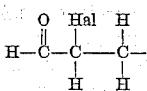

in which Z is a nitrogen atom having substituents which constitute a tertiary amine or quaternary ammonium compound. Such substitutions result in radicals such as —NRR′ and —NRR′R″X in which R′ is an aliphatic or aromatic radical and R and R″ are aliphatic radicals or may together represent the residue of a saturated or unsaturated ring structure with the nitrogen atom included as in the case of pyridine or quinoline. The monovalent anion represented by X is one of the halogens, preferably X and Hal of the general formula are like halogens although they can be different.

The new compounds are prepared by reacting together a 2,3-dihalopropionaldehyde and a secondary or tertiary amine.

The compounds prepared by methods of the present invention are white to yellowish deliquescent solids. In general, they are soluble in hydroxylated solvents and decompose on heating.

In carrying out my process the preferred 2,3-dihalopropionaldehyde is 2,3-dibrompropionaldehyde although the corresponding dichloro compound can be used and may be advantageous in some cases because of its lower cost.

As to the second intermediate when a secondary amine is used the symbol Z is found to be —NRR′ whereas the use of tertiary amines results in the production of compounds having the group —NRR′R″X. Suitable secondary amines include diethylamine, diisopropyl amine, dioctyl amine, morpholine, piperidine, piperazine, methylaniline and other aliphatic and aromatic secondary amines in which R and R′ may represent the same or different radicals which may or may not be united in a ring structure. Tertiary amines that may be used include pyridine, quinoline, isoquinoline, trimethylamine, dimethylaniline, etc.

The reaction is carried out at temperatures of from —40° to 15° C., preferably in the presence of an anhydrous solvent such as benzene, diethyl ether, etc. The reaction is generally complete in from about 2 hours to about 5 hours.

The new compounds are valuable as intermediates in the preparation of other organic compounds, particularly the biologically active substances known as folic acid and antagonists of folic acid. Those in which Z is the quaternary ammonium radical —NRR′R″X are cationic and are useful as surface active agents.

The following specific examples will show in greater particularity the preferred manner of carrying out the present invention.

Example 1

A solution of 108 g. (0.5 mole) of 2,3-dibromopropionaldehyde in 432 cc. anhydrous benzene is prepared. Then with stirring and cooling in an ice bath, there is added dropwise over a period of 1 hour a solution of 39.5 g. (0.5 mole) anhydrous pyridine in 50 cc. anhydrous benzene. The mixture is stirred in an ice bath an additional 2 hours, after which it is allowed to stand overnight at room temperature. Filtration (using precautions to exclude as much moisture as possible) gives a solid white product which is washed well with benzene. After drying in a desiccator over concentrated sulfuric acid, the product (115 g. 78%) is obtained as an extremely deliquescent white powder, insoluble in ether and benzene, and easily soluble in ethanol. After recrystallization from absolute isopropyl alcohol, the product, 2-bromo-2-formylethyl pyridinium bromide, using the conventional melting point apparatus, melts to a milky liquid at 55–65° C., clears to 80–90° C., then turns partly to a crystalline solid at 105–110° C. and melts completely at 120–125° C. Examined under the microscope at reduced pressure, the recrystallized product melts at 55–65° C., bubbles appear from 65° C. and crystals reappear from 105–110° C., which melt completely again at 130° C.

Example 2

A mixture of 82 g. (0.38 mole) of 2,3-dibromopropionaldehyde in 500 cc. absolute diethyl ether is prepared. The mixture is cooled to —30° C. and this temperature is maintained throughout the procedure. With stirring, there is then added dropwise over a period of 3 hours a solution of 49 g. (0.38 mole) anhydrous quinoline in 300 cc. absolute diethyl ether. After an additional stirring period of 1 hour at —30° C., the yellowish product which is precipitated is removed and after careful drying in a desiccator, it appeared as a solid with a yellowish tint. On heating the product, 2-bromo-2-formylethyl quinolinium bromide, decomposition begins to take place from about 85° C.

Example 3

A solution of 21.6 g. (0.1 mole) of 2,3-dibromopropionaldehyde in 160 cc. anhydrous benzene is prepared. Then over a period of one hour there is added dropwise with stirring a solution of 12.9 g. (0.1 mole) isoquinoline in 50 cc. anhydrous benzene. Throughout the procedure the mixture is cooled to 5° C. in an icebath. A white precipitate starts to form shortly after the addition is started, and after the addition is complete, the mixture is sirred for an additional 1.5 hours in the icebath. The product obtained by filtration is in the form of a white deliquescent solid. Purification by precipitation from a butanol-ether mixture gives 2-bromo-2-formylethyl isoquinolinium bromide with an indefinite melting point and decomposing at approximately 86–88° C.

Example 4

To a solution of 15 g. (0.07 mole) 2,4,5-triamino-6-hydroxypyrimidine dihydrochloride in 200 cc. of water is added enough pyridine to bring the solution to pH about 5. To this is added a solution of 21.4 g. (0.1 mole) 2,3-dibromopropionaldehyde in 100 cc. acetone, while adding pyridine as necessary to keep the mixture at pH 4–5, with cooling to keep the temperature in the solution at 30°–40° C. As soon as no more pyridine is required to maintain the pH at 4–5, 20 g. of diatomaceous earth is added, and the brown insoluble precipitate is filtered off and discarded. The filtrate is acidified with hydrochloric acid to pH 3–4, and a solution of iodine in potassium iodide and water is added until the reaction mixture gives a blue-black spot on starch-iodide test paper. There is an immediate precipitation of the light tan crystalline N-[(2-amino-4-hydroxy-6 - pyrimido[4,5 - b]pyrazyl)methyl]pyridinium iodide amounting to 8 g.

In the above example the compound 2-bromo-2-formylethyl pyridinium bromide is formed as an intermediate and is reacted without isolation with 2,4,5-triamino-6-hydroxypyrimidine dihydrochloride to form a compound useful in preparing folic acid.

I claim:

1. Compounds having the general formula:

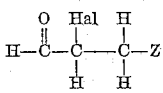

in which Hal is halogen and Z is a member of the group consisting of lower aliphatic tertiary amino, lower aliphatic quaternary ammonium, pyridinium, quinolinium and isoquinolinium radicals.

2. Compounds having the general formula:

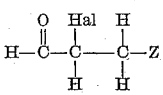

in which Hal is halogen and Z is a pyridinium halide radical.

3. 2-bromo-2-formylethyl pyridinium bromide.
4. 2-bromo-2-formylethyl quinolinium bromide.
5. 2-bromo-2-formylethyl iso-quinolinium bromide.

6. A method of preparing compounds having the general formula:

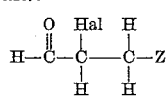

in which Hal is halogen and Z is a member of the group consisting of lower aliphatic tertiary amino, lower aliphatic quaternary ammonium, pyridinium, quinolinium and isoquinolinium radicals which comprises mixing together a compound having the formula:

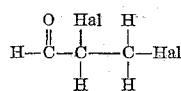

in which Hal is as defined above, and a member of the group consisting of lower aliphatic secondary amines, lower aliphatic tertiary amines, pyridine, quinoline and isoquinoline.

7. A method of preparing compounds having the general formula:

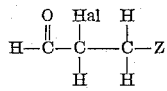

in which Hal is halogen and Z is a pyridinium halide radical which comprises mixing together a compound having the formula:

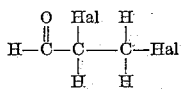

in which Hal is as defined above, and pyridine.

8. A method of preparing 2-bromo-2-formylethyl pyridinium bromide which comprises mixing 2,3-dibromopropionaldehyde with pyridine in an anhydrous solvent.

9. A method of preparing 2-bromo-2-formylethyl quinolinium bromide which comprises mixing 2,3-dibromopropionaldehyde with quinoline in any anhydrous solvent.

ERWIN KUH.

REFERENCES CITED

The following references are of record in the file of this patent:

UNITED STATES PATENTS

| Number | Name | Date |
| --- | --- | --- |
| 2,239,706 | Epstein et al. | Apr. 29, 1941 |
| 2,242,224 | Bley | May 20, 1941 |
| 2,252,252 | Harris | Sept. 9, 1941 |